United States Patent
Oyori et al.

(10) Patent No.: US 9,369,068 B2
(45) Date of Patent: Jun. 14, 2016

(54) CONTROL DEVICE FOR DRIVE DEVICE

(71) Applicants: IHI AEROSPACE CO., LTD., Tokyo (JP); SINFONIA TECHNOLOGY CO., LTD., Tokyo (JP)

(72) Inventors: Hitoshi Oyori, Tokyo (JP); Yoshito Ohta, Mie (JP); Keisuke Onishi, Mie (JP)

(73) Assignees: IHI AEROSPACE CO., LTD., Tokyo (JP); SINFONIA TECHNOLOGY CO., LTD., Tokyo (JP)

( * ) Notice: Subject to any disclaimer, the term of this patent is extended or adjusted under 35 U.S.C. 154(b) by 1 day.

(21) Appl. No.: 14/550,433

(22) Filed: Nov. 21, 2014

(65) Prior Publication Data
US 2015/0137724 A1    May 21, 2015

Related U.S. Application Data

(63) Continuation of application No. PCT/JP2013/063645, filed on May 16, 2013.

(30) Foreign Application Priority Data

May 22, 2012 (JP) ................. 2012-116417

(51) Int. Cl.
*H02P 5/00* (2006.01)
*G05B 11/38* (2006.01)
*G05B 11/36* (2006.01)

(52) U.S. Cl.
CPC ........ *H02P 5/00* (2013.01); *G05B 11/36* (2013.01); *G05B 11/38* (2013.01)

(58) Field of Classification Search
CPC ........... G05B 11/36; G05B 11/38; H02P 5/00

USPC ............ 318/490, 5, 8, 45, 55, 68, 69, 70, 99, 318/568.22, 563, 564; 700/79–82; 327/403, 327/407–415
See application file for complete search history.

(56) References Cited

U.S. PATENT DOCUMENTS

| | | | | | |
|---|---|---|---|---|---|
| 5,235,262 | A | * | 8/1993 | Takeuchi | G05B 19/237 318/603 |
| 6,028,409 | A | * | 2/2000 | Wierda | B25J 9/16 318/568.1 |

(Continued)

FOREIGN PATENT DOCUMENTS

| | | |
|---|---|---|
| JP | 2003-347705 A | 12/2000 |
| JP | 2003042258 A | 2/2003 |

(Continued)

OTHER PUBLICATIONS

International Search Report issued in PCT/JP2013/063645 completed on Aug. 7, 2013 and mailed on Aug. 20, 2013.
Extended European Search Report issued in corresponding application 13794437.7, issued Apr. 13, 2016.

*Primary Examiner* — Rita Leykin
(74) *Attorney, Agent, or Firm* — Griffin & Szipl, P.C.

(57) ABSTRACT

Multipliers 21a and 21b output values, which are obtained by multiplying a total drive command value $E_s$ by first and second gains $G_1$ and $G_2$, respectively, as first and second drive command values $E_1$ and $E_2$. Controllers 23a and 23b control first and second actuators (motors) 5 and 7, respectively, on the basis of the first and second drive command values. The detection values of the drive amounts of the actuators are denoted by $E_{f1}$ and $E_{f2}$, respectively, and the detection value of the drive amount of a driven body is denoted by $E_f$. A gain calculator 27 calculates the gains $G_1$ and $G_2$ on the basis of $E_{f1}$, $E_f$ and $E_{f2}$. An upper limit value of $E_f$, which denotes the drive amount of the driven body, is denoted by $L_{max}$. When $E_{f1}$, $E_{f2}$ or $E_f$ approaches zero, the first gain $G_1$ is brought close to $(E_{f1} - L_{max}/2)/(E_f - L_{max})$.

18 Claims, 5 Drawing Sheets

(56) References Cited

U.S. PATENT DOCUMENTS

| | | | |
|---|---|---|---|
| 6,208,923 B1 * | 3/2001 | Hommel | B62D 5/001 180/400 |
| 6,548,969 B2 * | 4/2003 | Ewbank | B62D 5/003 180/402 |
| 6,819,017 B2 * | 11/2004 | Winkel | F04D 29/263 310/112 |
| 7,130,728 B2 * | 10/2006 | Suzuki | B60T 8/885 180/402 |
| 7,222,008 B2 * | 5/2007 | Takahashi | B62D 5/003 180/443 |
| 2002/0195978 A1 * | 12/2002 | Oyori | F16H 25/2018 318/34 |

FOREIGN PATENT DOCUMENTS

| | | | | |
|---|---|---|---|---|
| JP | 2003345444 | * | 5/2003 | G05D 3/12 |
| JP | 2003219692 A | | 7/2003 | |
| JP | 3988988 B2 | | 10/2007 | |

* cited by examiner

CONTROL DEVICE FOR DRIVE DEVICE

This is a Continuation Application in the United States of International Patent Application No. PCT/JP2013/063645 filed May 16, 2013, which claims priority on Japanese Patent Application No. 2012/116417, filed May 22, 2012. The entire disclosures of the above patent applications are hereby incorporated by reference.

TECHNICAL FIELD

The present invention relates to a control device for a drive device provided with a first and a second actuators, a driven body that is driven by the actuators, and a power transmission mechanism that transmits the driving forces of the actuators to the driven body such that the driven body is driven by an amount equivalent to the total of the drive amounts of the actuators.

BACKGROUND ART

Conventionally, there is a case where two actuators are used to drive a single driven body such that, if one of the actuators fails, the driven body continues to be driven by the other actuator.

In this case, the drive amounts of the actuators are changed depending on whether the actuators are operating normally or abnormally. When both actuators are normally operating, each of the actuators drives the driven body by a drive amount that is half the total drive amount indicated by a command value. Thus, the driven body is driven by the total drive amount indicated by the command value. If one of the actuators fails, the other actuator drives the driven body by the total drive amount indicated by the command value.

To implement the control described above, according to Patent Document 1, the following method is carried out by using the configuration illustrated in FIG. 1.

(1) A drive amount $E_{f1}$ of a first motor (actuator) 61 and a drive amount $E_{f2}$ of a second motor (actuator) 63 are detected, and further, a total drive amount $E_f$ of the first and second motors 61 and 63 is detected from a detection value of the drive amount of a driven body.

(2) A first multiplier 65a outputs a value $E_{d1}$ obtained by multiplying a command value (a position command value in FIG. 1) $E_p$ by a gain $G_1$ (=$\Delta E_{f1}/\Delta E_f$) to a first subtractor 67a, while a second multiplier 65b outputs a value $E_{d2}$ obtained by multiplying a command value $E_p$ by a gain $G_2$ (=$\Delta E_{f2}/\Delta E_f$) to a second subtractor 67b. The symbol $\Delta$ in this case means change an amount (time change rate) of $E_f$, $E_{f1}$, and $E_{f2}$.

(3) The first subtractor 67a outputs the difference between $E_{d1}$ and $E_{f1}$ to a first controller 69a, while the second subtractor 67b outputs the difference between $E_{d2}$ and $E_{f2}$ to a second controller 69b.

(4) The first controller 69a drives the first motor 61 by the amount indicated by ($E_{d1}-E_{f1}$), while the second controller 69b drives the second motor 63 by the amount indicated by ($E_{d2}-E_{f2}$).

Thereafter, the steps (1) to (4) described above are repeated.

In this manner, when the motors 61 and 63 are normal, the motors 61 and 63 are driven by the same amount, so that $E_{f1}$ and $E_{f2}$ are equal. Therefore, $E_f$ denotes the total of $E_{f1}$ and $E_{f2}$, so that $G_1$ (=$\Delta E_{f1}/\Delta E_f$) and $G_2$ (=$\Delta E_{f2}/\Delta E_f$) will both be ½. Hence, the driven body is driven to a position indicated by $E_p$ by both the first and second motors 61 and 63.

Meanwhile, if the first motor 61 fails and stops operating, then $\Delta E_f$ will have the same value as that of $\Delta E_{f2}$, so that $G_2$ (=$\Delta E_{f2}/\Delta E_f$) will be 1. Hence, the driven body is driven to the position indicated by $E_p$ by the second motor 63. The same applies if the second motor fails and stops operating.

CITATION LIST

Patent Literature

Patent Literature 1: Japanese Patent No. 3988988

SUMMARY OF INVENTION

Technical Problem

Meanwhile, the gains $G_2$ and $G_2$ for the command value could be calculated on the basis of the detection values $E_f$, $E_{f1}$ and $E_{f2}$ rather than the change amounts (change rates) $\Delta E_f$, $\Delta E_{f1}$ and $\Delta E_{f2}$ of the detection values $E_f$, $E_{f1}$ and $E_{f2}$.

In this case, however, if the values of the detection values $E_f$, $E_{f1}$ and $E_{f2}$ are close to zero, then the ratios of the detection values $E_f$, $E_{f1}$ and $E_{f2}$ relative to noise become small. As a result, the errors of the gains $G_2$ and $G_2$ obtained on the basis of the $E_f$, $E_{f1}$ and $E_{f2}$ close to zero may become larger.

Accordingly, an object of the present invention is to reduce the errors of gains when the drive amounts of a first and a second actuators and the drive amount of a driven body are close to zero in the case where a gain for a command value for the first actuator is determined and a gain for a command value for the second actuator is determined on the basis of the detection values of the drive amounts of the first and second actuators and the detection value of the drive amount of the driven body.

Solution to Problem

In order to achieve the above-described object, according to the present invention, there is provided a control device for a drive device including a first and a second actuators, a driven body that is driven by the actuators, and a power transmission mechanism that transmits the driving forces of the actuators to the driven body such that the driven body is driven by an amount equivalent to the total of the drive amounts of the actuators, the control device including:

a first multiplier that outputs a value, which is obtained by multiplying a generated total drive command value by a first gain $G_1$, as a first drive command value;

a second multiplier that outputs a value, which is obtained by multiplying the total drive command value by a second gain $G_2$, as a second drive command value;

a first controller that controls the first actuator on the basis of the first drive command value;

a second controller that controls the second actuator on the basis of the second drive command value;

a gain calculator that calculates the gains $G_1$ and $G_2$;

a first drive amount detector that detects the drive amount of the first actuator and outputs a value $E_{f1}$ indicating the detection value to the gain calculator;

a second drive amount detector that detects the drive amount of the second actuator and outputs a value $E_{f1}$ indicating the detection value to the gain calculator; and a total drive amount detector that detects the drive amount of the driven body and outputs a value $E_f$ indicating the detection value to the gain calculator, wherein the gain calculator calculates the first gain $G_1$ according to a first gain calculation formula using $E_{f1}$ and $E_f$ as variables and calculates the second gain $G_2$ according to a second gain calculation formula using $E_{f2}$ and $E_f$ as variables, the first and second gain calculation formulae are set such that the first and the second gains $G_1$ and $G_2$ become ½ regardless of the values of the variables during a normal operation of the drive device, $E_f$ changes within a range from zero to an upper limit value $L_{max}$, the gain calculator brings the first gain $G_1$ close to $(E_{f1}-L_{max}/2)/(E_f-L_{max})$ and brings the second gain $G_2$ close to $(E_{f2}-L_{max}/2)/(E_f-L_{max})$ in the case where $E_{f1}$, $E_{f2}$, or $E_f$ approaches zero.

According to a preferred embodiment of the present invention, the first and second gain calculation formulae are $$G_1 = G_{1A} + G_{1B} \text{ and}$$

$$G_2 = G_{2A} + G_{2B}, \text{ respectively,}$$

where $G_{1A}$, $G_{1B}$ and $G_{2A}$, $G_{2B}$ in the above formulae are determined by the following expression.

$$G_{1A} = \frac{E_{f1}}{E_{f1max}} \times G_{1AA} \qquad G_{2A} = \frac{E_{f2}}{E_{f2max}} \times G_{2AA} \qquad [\text{Expression 1}]$$

$$G_{1B} = \left(1 - \frac{E_{f1}}{E_{f1max}}\right) \times G_{1BB}$$

$$G_{2B} = \left(1 - \frac{E_{f2}}{E_{f2max}}\right) \times G_{2BB}$$

In the expression, $E_{f1max}$ denotes a maximum value that the drive amount of the first actuator can take when the first and the second actuators are normally operating, and $E_{f2max}$ denotes a maximum value that the drive amount of the second actuator can take when the first and the second actuators are normally operating. $G_{1AA}$, $G_{1BB}$ and $G_{2AA}$, $G_{2BB}$ are determined by the following expression.

$$G_{1AA} = \frac{E_{f1}}{E_f} \qquad G_{2AA} = \frac{E_{f2}}{E_f} \qquad [\text{Expression 2}]$$

$$G_{1BB} = \frac{E_{f1} - \frac{L_{max}}{2}}{E_f - L_{max}} \qquad G_{2BB} = \frac{E_{f2} - \frac{L_{max}}{2}}{E_f - L_{max}}$$

In the expression, $L_{max}$ is ideally equal to the sum of $E_{f1max}$ and $E_{f2max}$.

Thereby, the values of the first and second gains $G_1$ and $G_2$ gradually change as $E_f$, $E_{f1}$ and $E_{f2}$ change, so that the first and the second gains $G_1$ and $G_2$ are stably calculated.

Further, the numerators of the first and second gains $G_1$ and $G_2$ do not approach zero in the process of calculating the gains over the entire range of $E_f$, $E_{f1}$ and $E_{f2}$, so that the influences of noise can be suppressed, permitting reduced errors of the first and the second gains $G_1$ and $G_2$.

According to a preferred embodiment of the present invention, the control device includes:

a first state determiner that determines whether or not the first actuator is normally operating; and a second state determiner that determines whether or not the second actuator is normally operating, wherein the first multiplier outputs a value, which is obtained by multiplying the first gain $G_1$ calculated by the gain calculator by a total drive command value, as a first drive command value, and the second multiplier outputs a value, which is obtained by multiplying the second gain $G_2$ calculated by the gain calculator by the total drive command value, as a second drive command value in the case where the first and the second state determiners have determined that the first and the second actuators are normally operating, the second multiplier outputs a value, which is obtained by multiplying the second gain $G_2$ whose value is 1 by the total drive command value, as the second drive command value in the case where the first state determiner has determined that the first actuator is not operating, and the first multiplier outputs a value, which is obtained by multiplying the first gain $G_1$ whose value is 1 by the total drive command value, as the first drive command value in the case where the second state determiner has determined that the second actuator is not operating.

With this arrangement, even if one of the actuators stops operating, the driven body can be operated automatically according to the total drive command value.

Further, according to a preferred embodiment of the present invention, the first state determiner determines, on the basis of $E_{f1}$ and $E_f$, whether or not the first actuator is normally operating, and the second state determiner determines, on the basis of $E_{f1}$ and $E_f$, whether or not the second actuator is normally operating.

According to a preferred embodiment of the present invention, the total drive command value is the difference between $E_f$ and the position command value $E_p$ in the range from zero to a maximum value, and the difference is input as the total drive command value to the first and second multipliers, and the control device further includes:

a failure detector that detects a failure of the total drive amount detector, and a signal value switcher that sets a signal value to be input as the total drive command value to the first and second multipliers to a difference between $E_p$ and $2E_{f1}$ or the difference between $E_p$ and $2E_{f2}$ and fixes the first and second gains $G_1$ and $G_2$ to be input to the first and second multipliers to ½ in the case where the failure detector has detected a failure of the total drive amount detector.

According to another preferred embodiment of the present invention, the total drive command value indicates the position command value $E_p$ in a range from zero to a maximum value, and the control device includes:

a first subtractor that receives a first drive command value, which is output by the first multiplier, and $E_{f1}$ and outputs a difference between the two received signal values to the first controller; and a second subtractor that receives a second drive command value, which is output by the second multiplier, and $E_{f2}$ and outputs a difference between the two received signal values to the second controller, wherein the first controller controls the first actuator according to a difference between the first drive command value and $E_{f1}$, while the second controller controls the second actuator according to a difference between the second drive command value and $E_{f2}$, and the control device further includes:

a failure detector that detects a failure of the total drive amount detector, wherein the first and second gains $G_1$ and $G_2$ to be input to the first and the second multipliers are fixed to ½ in the case where the failure detector has detected a failure of the total drive amount detector.

Advantageous Effects of Invention

According to the present invention described above, the detection value of the drive amount of the first actuator is denoted by $E_{f1}$, the detection value of the drive amount of the driven body is denoted by $E_f$, and the upper limit value of $E_f$ indicating the drive amount of the driven body is denoted by $L_{max}$. If $E_{f1}$, $E_{f1}$ or $E_f$ approaches zero, then the first gain $G_1$ is brought close to $(E_{f1}-L_{max}/2)/(E_f-L_{max})$. Hence, the numerator $(E_{f1}-L_{max}/2)$ of the first gain $G_1$ does not approach zero, and the denominator $(E_f-L_{max})$ of the first gain $G_1$ does not approach to zero, either. This makes it possible to maintain a high ratio of $(E_{f1}-L_{max}/2)$ and $(E_f-L_{max})$ with respect to noise in the process of calculating the first gain $G_1$. As a result, the error of the first gain $G_1$ can be reduced. The same applies to the second gain $G_2$.

DESCRIPTION OF EMBODIMENTS

Figure 1:
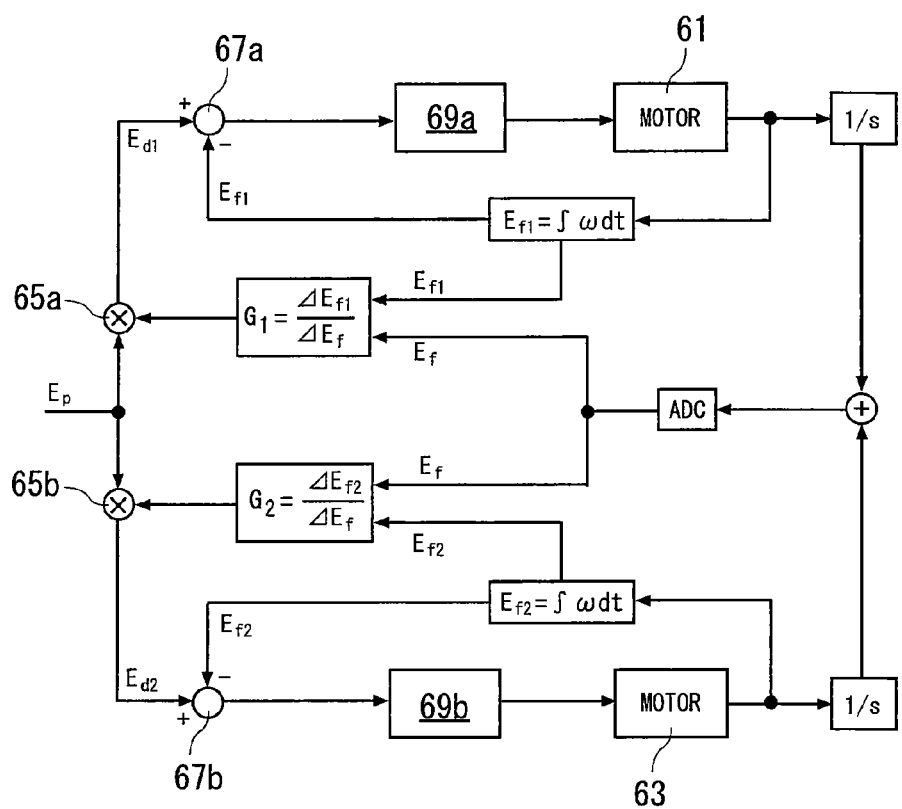
FIG. 1 is a diagram illustrating the control described in Patent Document 1.

A preferred embodiment of the present invention will be described with reference to the accompanying drawings. The same components in the drawings will be assigned the same reference numerals and duplicate description thereof will be omitted.

A control device 10 according to the embodiment of the present invention is adapted to control a drive device 3. The drive device 3 includes first and second actuators 5 and 7, a driven body 9 driven by these actuators, and a power transmission mechanism 11 that transmits the driving forces of the actuators 5 and 7 to the driven body 9 such that the driven body 9 is driven by an amount equivalent to the total of the drive amounts of the actuators 5 and 7.

Figure 2:
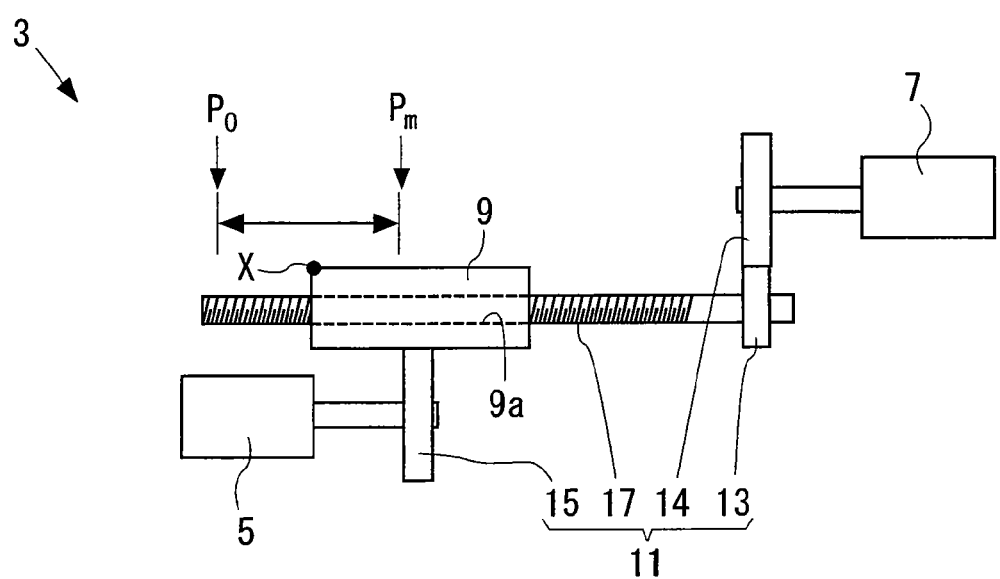
FIG. 2 illustrates an example of a drive device to be controlled by a control device according to an embodiment of the present invention.

Referring to FIG. 2, an example of the drive device 3 will be described.

The actuators 5 and 7 are motors in the example of FIG. 2. The first motor 5 rotatively drives the driven body 9, while the second motor 7 rotatively drives a gear 13.

The driven body 9 includes many teeth, which mesh with a gear 15, on the outer peripheral surface thereof. The gear 15 is fixed to an output shaft of the first motor 5. Further, a through hole 9a into which a screw shaft 17 penetrates is formed at the center of the driven body 9 in the axial direction thereof. The inner peripheral surface of the through hole 9a is provided with a female screw to which the screw shaft 17 is threaded. In other words, the screw shaft 17 and the driven body 9 constitute a ball screw, and the driven body 9 corresponds to a nut of the ball screw.

The power transmission mechanism 11 includes gears 13 and 14, the screw shaft 17, and the gear 15. The gear 13 is coaxially fixed to the screw shaft 17. The gear 14 is fixed to an output shaft of the second motor 7 and meshes with the gear 13. The power transmission mechanism 11 transmits the driving forces of the motors 5 and 7 to the driven body 9 such that the driven body 9 is moved relative to the screw shaft 17 in the axial direction of the screw shaft 17 by an amount equivalent to the total of the drive amounts of the first and the second motors 5 and 7. The screw shaft 17 may be rotatably supported by a member, which is not illustrated.

The driven body 9 (a reference point X of the driven body 9 in the example of FIG. 2) is adapted to be movable within the range from one limit position $P_0$ to the other limit position $P_m$.

The drive device 3 may be used, for example, to change the direction of a nozzle or a variable wing provided on an airplane or a rocket. The nozzle ejects a fuel gas toward the back of the airplane or the rocket to thereby generate a propulsive power of the airplane or the rocket. The variable wing changes the direction of gas flow aerodynamically acting on the airplane or the rocket to thereby change the direction of the force of the gas acting on the airframe or to thereby adjust the combustion performance of the engine thereof.

Figure 3:
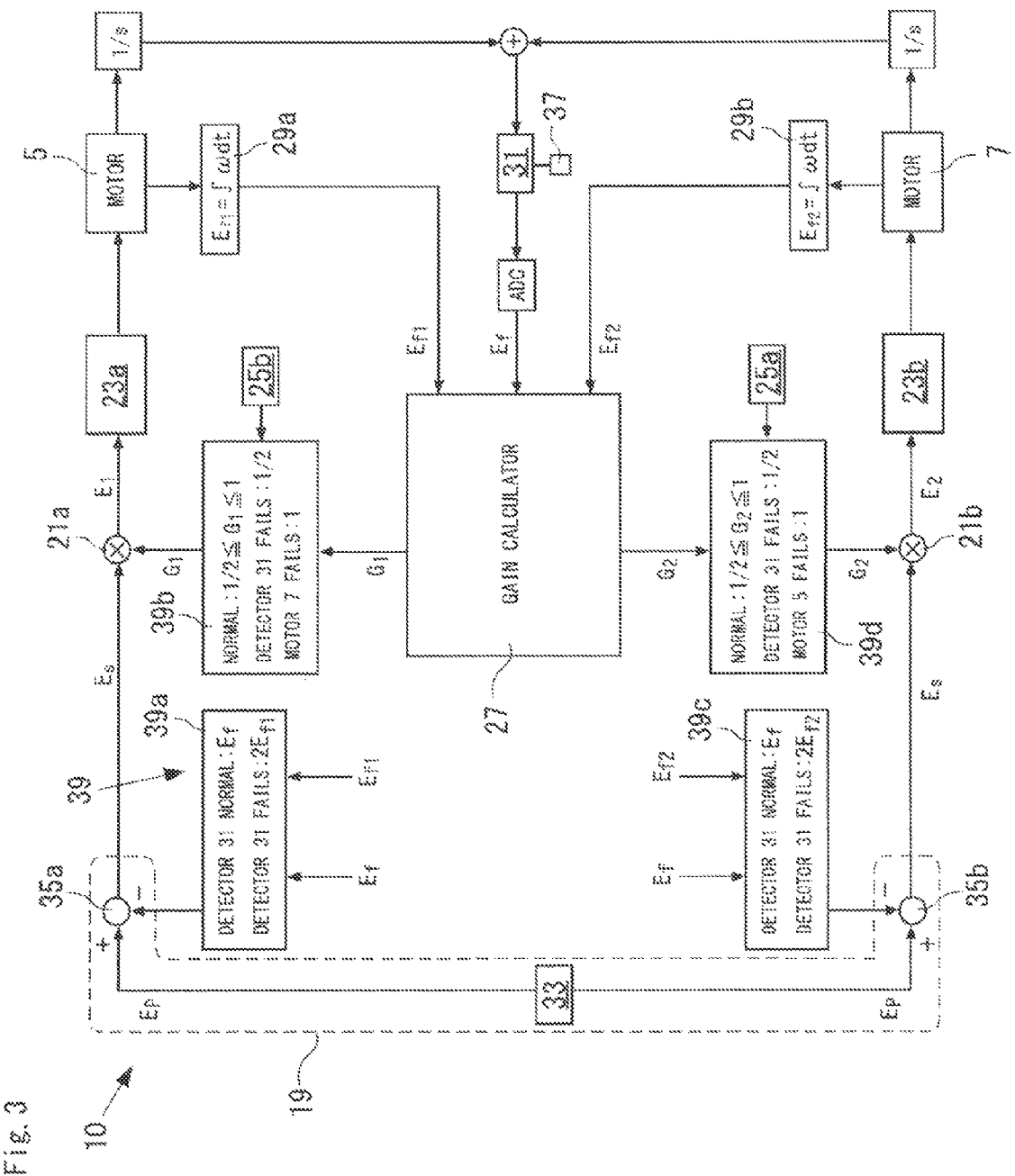
FIG. 3 is a block diagram of a control device according to the embodiment of the present invention.
Figure 4:
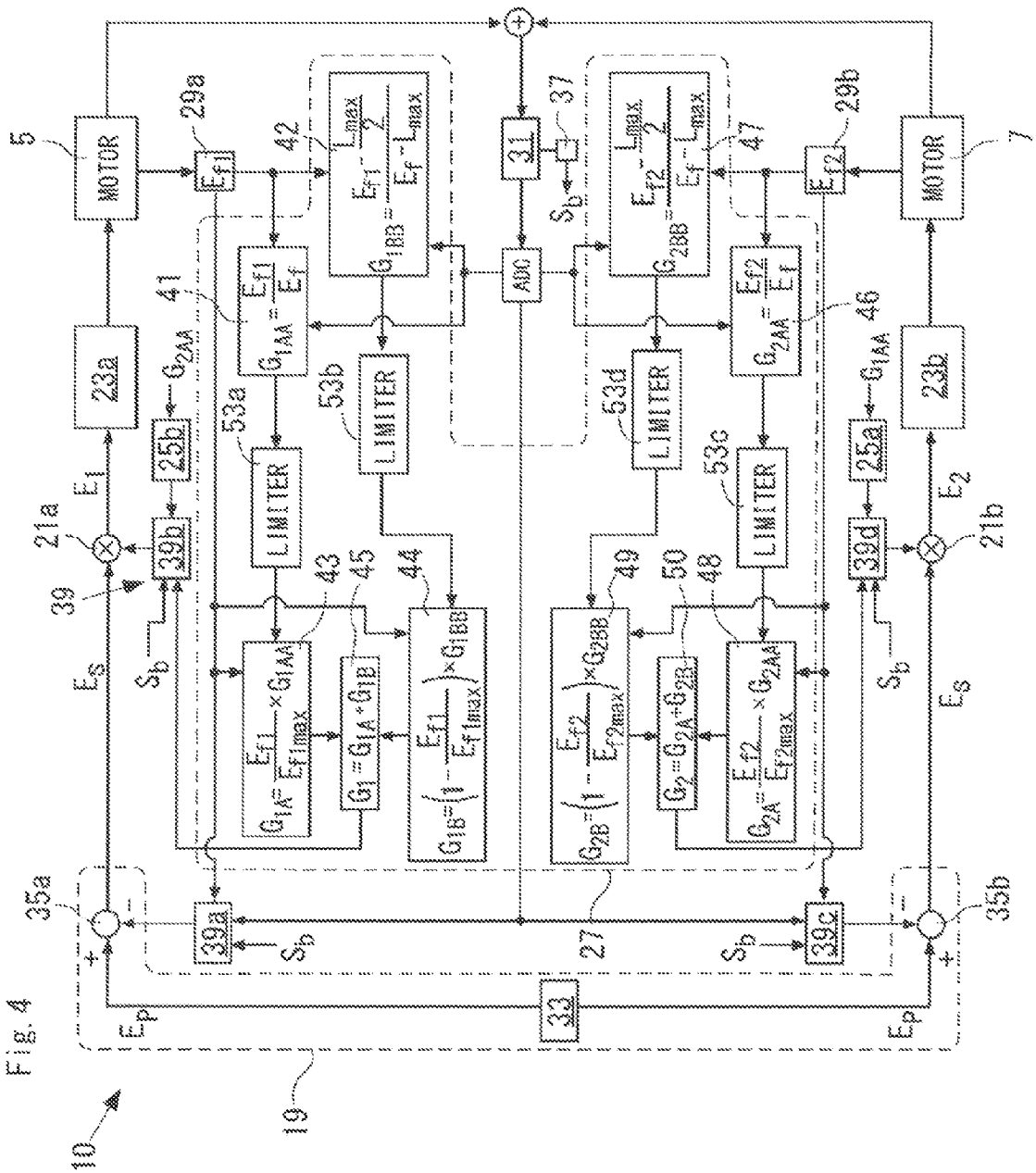
FIG. 4 is a detailed diagram of the control device according to the embodiment of the present invention.

FIG. 3 illustrates the control device 10 of the drive device 3 according to the embodiment of the present invention. FIG. 4 is a detailed diagram of FIG. 3.

The control device 10 includes a command value generator 19, first and second multipliers 21a, 21b, first and second controllers 23a, 23b, first and second state determiners 25a, 25b, and a gain calculator 27.

The command value generator 19 generates a total drive command value $E_s$.

The first multiplier 21a outputs a value, which is obtained by multiplying the total drive command value $E_s$ by a first gain $G_1$, as a first drive command value $E_1$ to the first controller 23a.

The second multiplier 21b outputs a value, which is obtained by multiplying the total drive command value $E_s$ by a second gain $G_2$, as a second drive command value $E_2$ to the second controller 23b.

The first controller 23a controls a first actuator 5 on the basis of the first drive command value $E_1$. In the example illustrated in FIG. 3 and FIG. 4, the first controller 23a causes the first actuator 5 to be driven by the amount indicated by the first drive command value $E_1$.

The second controller 23b controls a second actuator 7 on the basis of the second drive command value $E_2$. In the example illustrated in FIG. 3 and FIG. 4, the second controller 23b causes the second actuator 7 to be driven by the amount indicated by the second drive command value $E_2$.

The first state determiner 25a determines whether or not the first actuator 5 is normally operating. In the present embodiment, the first state determiner 25a carries out the determination on the basis of $E_{f1}$ and $E_f$. For example, if $E_{f1}/E_f$ is not more than a threshold value that is smaller than ½, then the first state determiner 25a determines that the first actuator 5 is not operating. In other words, the first state determiner 25a determines that the driven body 9 is not being driven by the first actuator 5. In this case, $E_{f1}/E_f$ is input to the first state determiner 25a from a first arithmetic section 41, which will be discussed hereinafter, and the first state determiner 25a compares the input $E_{f1}/E_f$ with the above-mentioned threshold value to carry out the determination. On the other hand, if the $E_{f1}/E_f$ is larger than the threshold value, then the first state determiner 25a determines that the first actuator 5 is normally operating. The first state determiner 25a may use a different method to determine whether or not the first actuator 5 is normally operating.

In the same manner, the second state determiner 25b determines whether or not the second actuator 7 is normally operating. In the present embodiment, the second state determiner 25b carries out the determination on the basis of $E_{f2}$ and $E_f$. For example, if $E_{f2}/E_f$ is not more than a threshold value that is smaller than ½, then the second state determiner 25b determines that the second actuator 7 is not operating. In other words, the second state determiner 25b determines that the driven body 9 is not being driven by the second actuator 7. In this case, $E_{f2}/E_f$ is input to the second state determiner 25b from a sixth arithmetic section 46, which will be discussed hereinafter, and the second state determiner 25b compares the input $E_{f2}/E_f$ with the above-mentioned threshold value to carry out the determination. On the other hand, if the $E_{f2}/E_f$ is larger than the threshold value, then the second state determiner 25b determines that the second actuator 7 is normally operating. The second state determiner 25b may use a different method to determine whether or not the second actuator 7 is normally operating.

The gain calculator 27 calculates the first and second gains $G_1$ and $G_2$ described above.

According to the present embodiment, the control device 10 further includes a first drive amount detector 29a, a second drive amount detector 29b, and a total drive amount detector 31.

The first drive amount detector 29a detects the drive amount of the first actuator 5 and outputs the value $E_{f1}$ indicating the detection value to the gain calculator 27.

The second drive amount detector 29b detects the drive amount of the second actuator 7 and outputs the value $E_{f2}$ indicating the detection value to the gain calculator 27.

The total drive amount detector 31 detects the drive amount of the driven body 9 and outputs the value $E_f$ indicating the detection value to the gain calculator 27. In the example of FIG. 2, $E_f$ changes within the range from zero denoting a limit position $P_0$ to an upper limit value $L_{max}$ indicating a limit position $P_m$. More specifically, if $E_f$ is zero, then the driven body 9 is located at the limit position $P_0$ and if $E_f$ is the upper limit value $L_{max}$, then the driven body 9 is located at the limit position $P_m$.

$E_{f1}$ and $E_{f2}$ denote the amounts by which the actuators 5 and 7, respectively, have been driven (the operated amounts) from their initial positions, and $E_f$ denotes the sum of the amount by which the actuator 5 has been driven from its initial position and the amount by which the actuator 7 has been driven from its initial position. While the drive device 3 is normal, the sum of the $E_{f1}$ and $E_{f2}$ is equal to $E_f$.

If the first and second state determiners 25a and 25b determine that the first and second actuators 5 and 7, respectively, are normally operating, then the gain calculator 27 calculates the first gain $G_1$ according to a first gain calculation formula using $E_{f1}$ and $E_f$ as variables and also calculates the second gain $G_2$ according to a second gain calculation formula using $E_{f2}$ and $E_f$ as variables. The first and second gain calculation formulae are set such that the first and second gains $G_1$ and $G_2$ are ½ in the case where the drive device 3 is normal and $E_{f1}$, $E_{f2}$, $E_f$ and the like are not influenced by noise. Thereby, a value that is half the total drive command value $E_s$ is supplied to the first controller 23a and the second controller 23b, and the first controller 23a and the second controller 23b drive the first and second actuators 5 and 7, respectively, by half the amount indicated by the total drive command value $E_s$. As a result, the driven body 9 is driven by an amount corresponding to the total drive command value $E_s$.

If the first state determiner 25a determines that the first actuator 5 is not operating, then the value of the second gain $G_2$ to be supplied to the second multiplier 21b is set to 1 by a switcher 39d. Thereby, the second multiplier 21b outputs, as a second drive command value $E_2$, a value obtained by multiplying the second gain $G_2$ whose value is 1 by the total drive command value $E_s$.

In the same manner, if the second state determiner 25b determines that the second actuator 7 is not operating, then the value of the first gain $G_1$ to be supplied to the first multiplier 21a is set to 1 by a switcher 39b. Thereby, the first multiplier 21a outputs, as a first drive command value $E_1$, a value obtained by multiplying the first gain $G_1$ whose value is 1 by the total drive command value $E_s$.

According to the present embodiment, the gain calculator 27 calculates the first and second gains $G_1$ and $G_2$ such that the following (A) and (B) are satisfied.

(A) If $E_{f1}$, $E_{f2}$ or $E_f$ approaches zero, then the gain calculator 27 brings the first gain $G_1$ close to $(E_{f1}-L_{max}/2)/(E_f-L_{max})$ and brings the second gain $G_2$ close to $(E_{f2}-L_{max}/2)/(E_f-L_{max})$. When $E_{f1}$ approaches zero, the numerator $(E_{f1}-L_{max}/2)$ of the first gain $G_1$ does not approach zero, and the denominator $(E_f-L_{max})$ of the first gain $G_1$ does not approach zero, either. This makes it possible to maintain a high ratio of the first gain $G_1$ with respect to noise. The same applies to the second gain $G_2$.

(B) Meanwhile, if the total drive command value $E_s$ approaches the upper limit value, then the gain calculator 27 brings the first gain $G_1$ close to $E_{f1}/E_f$ and brings the second gain $G_2$ close to $E_{f2}/E_f$.

Preferably, the first and second gain calculation formulae are set to satisfy the above-mentioned matters (A) and (B). In the present embodiment, the first and second gain calculation formulae are:

$$G_1 = G_{1A} + G_{1E}, \text{ and}$$

$$G_2 = G_{2A} + G_{2B}, \text{ respectively, and}$$

$G_{1A}$, $G_{1B}$ and $G_{2A}$, $G_{2B}$ in the above formulae are determined by the following expression.

$$G_{1A} = \frac{E_{f1}}{E_{f1max}} \times G_{1AA} \qquad G_{2A} = \frac{E_{f2}}{E_{f2max}} \times G_{2AA} \qquad \text{[Expression 1]}$$

$$G_{1B} = \left(1 - \frac{E_{f1}}{E_{f1max}}\right) \times G_{1BB}$$

$$G_{2B} = \left(1 - \frac{E_{f2}}{E_{f2max}}\right) \times G_{2BB}$$

where $E_{f1max}$ denotes a maximum value that the drive amount of the first actuator 5 can take when the first and the second actuators 5 and 7 are normally operating, and $E_{f2max}$ denotes a maximum value that the drive amount of the second actuator 7 can take when the first and the second actuators 5 and 7 are normally operating. $G_{1AA}$, $G_{1BB}$ and $G_{2AA}$, $G_{2BB}$ are determined by the following expression.

$$G_{1AA} = \frac{E_{f1}}{E_f} \qquad G_{2AA} = \frac{E_{f2}}{E_f} \qquad \text{[Expression 2]}$$

$$G_{1BB} = \frac{E_{f1} - \frac{L_{max}}{2}}{E_f - L_{max}} \qquad G_{2BB} = \frac{E_{f2} - \frac{L_{max}}{2}}{E_f - L_{max}}$$

where $L_{max}$ is ideally equal to the sum of $E_{f1max}$ and $E_{f2max}$. $L_{max}$ is also equal to the position command value $E_p$ (which will be discussed hereinafter) for moving the driven body 9 to the limit position $P_m$. The term "ideally" in this case refers to $E_{f1max}$ and $E_{f2max}$ not having incurred an error and $E_{f1max}$ and $E_{f2max}$ not having been affected by noise. The error in this case refers to an error attributable to the drive device 3 (e.g. a mechanical error) or an error attributable to the control device 10.

In the case of calculating $G_1$ and $G_2$ by using $G_{1A}$, $G_{1B}$, $G_{2A}$ and $G_{2B}$ described above, the following (a), (b) and (c) can be established when the first and second actuators 5 and 7 are normally operating.

(a) If $G_{1A}$, $G_{1B}$, $G_{2A}$ and $G_{2B}$ are not affected by noise, then $G_1$ and $G_2$ will be ½, because $E_f=2E_{f1}=2E_{f2}$ and $L_{max}=2E_{f1max}=2E_{f2max}$ are established.

(b) When $E_{f1}$, $E_{f2}$ or $E_f$ approaches zero, the first gain $G_1$ approaches $(E_{f1}-L_{max}/2)/(E_f-L_{max})$ and the second gain $G_2$ approaches $(E_{f2}-L_{max}/2)/(E_f-L_{max})$.

(c) When $E_f$ approaches the upper limit value, the first gain $G_1$ approaches $E_{f1}/E_f$ and the second gain $G_2$ approaches $E_{f2}/E_f$.

When the control device 10 is started up, the first and second gains $G_1$ and $G_2$ may take an initial value of ½.

According to the present embodiment, the command value generator 19 includes a position command section 33, a first subtractor 35a, and a second subtractor 35b.

The position command section 33 outputs a position command value $E_p$ within the range from zero to a maximum value. In the example of FIG. 2, if the position command value $E_p$ of zero is output, then the control device 10 positions the driven body 9 at the limit position $P_0$, and if the position command value $E_p$ of the upper limit value is output, then the control device 10 controls the driven body 9 to position the driven body 9 at the limit position $P_m$.

The first subtractor 35a receives $E_p$ and $E_f$. The first subtractor 35a outputs the difference between the two received signal values ($E_p$ and $E_f$) to the first multiplier 21a as the total drive command value $E_s$.

The second subtractor 35b also receives $E_p$ and $E_f$. The second subtractor 35b outputs the difference between the two received signal values ($E_p$ and $E_f$) to the second multiplier 21b as the total drive command value $E_s$.

The control device 10 further includes a failure detector 37 and a signal value switcher 39.

The failure detector 37 detects a failure of the total drive amount detector 31. If the failure detector 37 detects a failure of the total drive amount detector 31, then the failure detector 37 outputs a signal $S_b$ indicating the detection of the failure to the signal value switcher 39.

The signal value switcher 39 includes a first switcher 39a, a second switcher 39b, a third switcher 39c, and a fourth switcher 39d.

In the case where the failure detector 37 does not detect a failure of the total drive amount detector 31, the signal value switcher 39 inputs $E_f$ to the first subtractor 35a as described above through the first switcher 39a, sets $G_1$ to be input to the first multiplier 21a to the value $G_1$ calculated by the gain calculator 27 as described above through the second switcher 39b, inputs $E_f$ to the second subtractor 35b as described above through the third switcher 39c, and sets $G_2$ to be input to the second multiplier 21b to the value $G_2$ calculated by the gain calculator 27 as described above through the fourth switcher 39d. Accordingly, the first multiplier 21a outputs a value, which is obtained by multiplying $G_1$ calculated by the gain calculator 27 by $(E_p-E_f)$ as described above, to the first controller 23a, while the second multiplier 21b outputs a value, which is obtained by multiplying $G_2$ calculated by the gain calculator 27 by $(E_p-E_f)$ as described above, to the second controller 23b.

However, the following is preferably adopted. If the value $G_1$ from the gain calculator 27 is smaller than ½, then the second switcher 39b fixes $G_1$ to be input to the first multiplier 21a to ½. If the value $G_1$ from the gain calculator 27 is larger than 1, then the second switcher 39b fixes $G_1$ to be input to the first multiplier 21a to 1. If the value $G_2$ from the gain calculator 27 is smaller than ½, then the fourth switcher 39d fixes $G_2$ to be input to the second multiplier 21b to ½. If the value $G_2$ from the gain calculator 27 is larger than 1, then the fourth switcher 39d fixes $G_2$ to be input to the second multiplier 21b to 1.

Meanwhile, if the failure detector 37 detects a failure of the total drive amount detector 31, then a signal $S_b$ indicating the detection of the failure is input to the signal value switcher 39. Thereby, the signal value switcher 39 changes the value to be input to the first subtractor 35a from $E_f$ to $2E_{f1}$ by the first switcher 39a, fixes $G_1$ to be input to the first multiplier 21a to ½ by the second switcher 39b, changes the value to be input to the second subtractor 35b from $E_f$ to $2E_{f2}$ by the third switcher 39c, and fixes $G_2$ to be input to the second multiplier 21b to ½ by the fourth switcher 39d. Therefore, the first multiplier 21a outputs the value obtained by multiplying $(E_p-2E_{f1})$ by ½ to the first controller 23a, while the second multiplier 21b outputs the value obtained by multiplying $(E_p-2E_{f2})$ by ½ to the second controller 23b.

The gain calculator 27 includes first to tenth arithmetic sections 41 to 50.

The first arithmetic section 41 calculates the above-mentioned $G_{1AA}$ on the basis of $E_{f1}$ received from the first drive amount detector 29a and $E_f$ received from the total drive amount detector 31.

The second arithmetic section 42 calculates the above-mentioned $G_{1BB}$ on the basis of $E_{f1}$ received from the first drive amount detector 29a and $E_f$ received from the total drive amount detector 31.

The third arithmetic section 43 calculates the above-mentioned $G_{1A}$ on the basis of $G_{1AA}$ received from the first arithmetic section 41 and $E_{f1}$ received from the first drive amount detector 29a.

The fourth arithmetic section 44 calculates the above-mentioned $G_{1B}$ on the basis of $G_{1BB}$ received from the second arithmetic section 42 and $E_{f1}$ received from the first drive amount detector 29a.

The fifth arithmetic section 45 calculates a gain $G_1$, which is the sum of $G_{1A}$ and $G_{1B}$, on the basis of $G_{1A}$ received from the third arithmetic section 43 and $G_{1B}$ received from the fourth arithmetic section 44.

The sixth arithmetic section 46 calculates the above-mentioned $G_{2AA}$ on the basis of $E_{f2}$ received from the second drive amount detector 29b and $E_f$ received from the total drive amount detector 31.

The seventh arithmetic section 47 calculates the above-mentioned $G_{2BB}$ on the basis of $E_{f2}$ received from the second drive amount detector 29b and $E_f$ received from the total drive amount detector 31.

The eighth arithmetic section 48 calculates the above-mentioned $G_{2A}$ on the basis of $G_{2AA}$ received from the sixth arithmetic section 46 and $E_{f2}$ received from the second drive amount detector 29b.

The ninth arithmetic section 49 calculates the above-mentioned $G_{2B}$ on the basis of $G_{2BB}$ received from the seventh arithmetic section 47 and $E_{f2}$ received from the second drive amount detector 29b.

The tenth arithmetic section 50 calculates a gain $G_2$, which is the sum of $G_{2A}$ and $G_{2B}$, on the basis of $G_{2A}$ received from the eighth arithmetic section 48 and $G_{2B}$ received from the ninth arithmetic section 49.

Preferably, the control device 10 includes a first to a fourth limiters 53a, 53b, 53c, and 53d.

The first limiter 53a limits $G_{1AA}$ calculated by the first arithmetic section 41 to the range from ½ to 1. More specifically, if the value of $G_{1AA}$ calculated by the first arithmetic section 41 is smaller than ½, then the first limiter 53a supplies $G_{1AA}$ fixed to ½ to the third arithmetic section 43. If the value of $G_{1AA}$ calculated by the first arithmetic section 41 is larger than 1, then the first limiter 53a supplies $G_{1AA}$ fixed to 1 to the third arithmetic section 43. If the value of $G_{1AA}$ calculated by the first arithmetic section 41 is ½ or more and 1 or less, then the first limiter 53a supplies the value of $G_{1AA}$ as it is to the third arithmetic section 43.

In the same manner, the second, third, and fourth limiters 53b, 53c, and 53d limit the values of $G_{1BB}$, $G_{2AA}$, and $G_{2BB}$ calculated by the second, sixth, and seventh arithmetic sections 42, 46, and 47, respectively, to values of ½ to 1.

The limiters make it possible to obviate the occurrence of states in which noise causes $G_{1AA}$, $G_{1BB}$, $G_{2AA}$, and $G_{2BB}$ to take logically impossible values.

It is obvious that the present invention is not limited to the embodiment described above, and a variety of modifications can be added within the range that does not deviate from the gist of the present invention. For example, any one of the following modification examples 1 to 4 may be adopted or any combinations of the modification examples 1 to 4 may be adopted. In this case, the aspects that are not described below may be the same as those described above.

Modification Example 1

The first gain calculation formula may be $E_{f1}/E_f$ and the second gain calculation formula may be $E_{f2}/E_f$. In this case, when $E_{f1}$, $E_{f2}$, or $E_f$ approaches zero, the gain calculator 27 switches the first gain calculation formula to $(E_{f1}-L_{max}/2)/(E_f-L_{max})$ and switches the second gain calculation formula to $(E_{f2}-L_{max}/2)/(E_f-L_{max})$.

Modification Example 2

Figure 5:
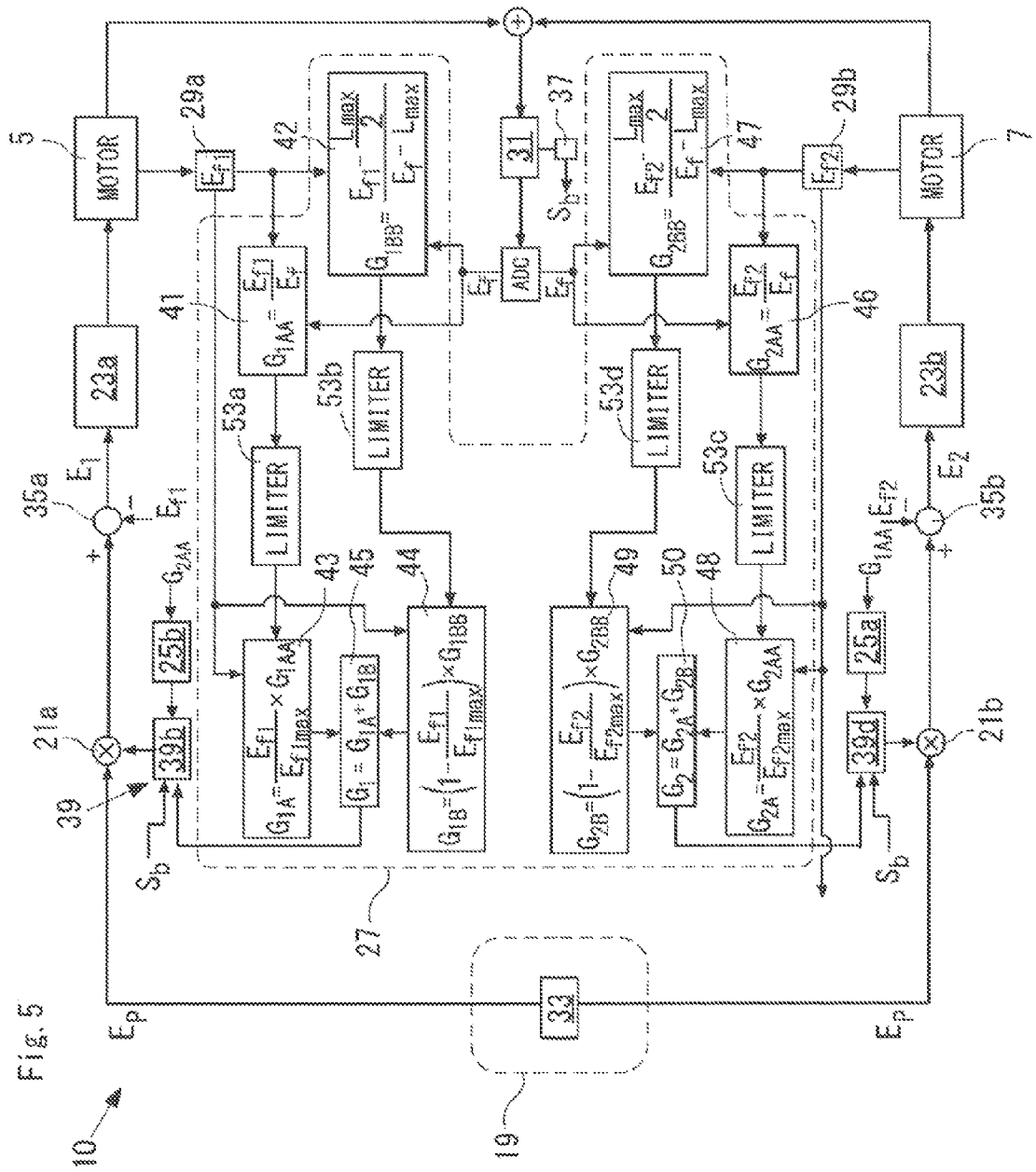
FIG. 5 is a detailed diagram of a control device according to a modified example of the present invention.

As illustrated in FIG. 5, a command value generator 19 may be constituted of a position command section 33, which outputs, as a total drive command value, a position command value $E_p$ in the range from zero to a maximum value. In this case, a control device 10 may be constructed as described below.

A first multiplier 21a outputs, as a first drive command value, the value obtained by multiplying a total drive command value $E_p$ by the first gain $G_1$. A first subtractor 35a receives the first drive command value output by the first multiplier 21a and $E_{f1}$. The first subtractor 35a outputs the difference between the two received signal values to the first controller 23a. The first controller 23a controls the first actuator 5 according to the difference between the first drive command value and $E_{f1}$.

A second multiplier 21b outputs, as a second drive command value, the value obtained by multiplying the total drive command value $E_p$ by the second gain $G_2$. A second subtractor 35b receives the second drive command value output by the second multiplier 21b and $E_{f2}$. The second subtractor 35b outputs the difference between the two received signal values to the second controller 23b. The second controller 23b controls the second actuator 7 according to the difference between the second drive command value and $E_{f2}$.

If the first state determiner 25a determines that the first actuator 5 is not operating, then the second drive command value output from the second multiplier 21b and $E_f$ are input to the second subtractor 35b. If the second state determiner 25b determines that the second actuator 7 is not operating, then the first drive command value output from the first multiplier 21a and $E_f$ are input to the first subtractor 35a.

The first and third switchers 39a and 39c are omitted and the failure detector 37 functions as described below.

In the case where the failure detector 37 does not detect a failure of the total drive amount detector 31, $E_{f1}$ is input to the first subtractor 35a and $G_1$ to be input to the first multiplier 21a is set to $G_1$ of the value calculated by the gain calculator 27 as described above by the second switcher 39b, and $E_{f2}$ is input to the second subtractor 35b and $G_2$ to be input to the second multiplier 21b is set to $G_2$ of the value calculated by the gain calculator 27 as described above by the fourth switcher 39d. Hence, the first multiplier 21a outputs a value, which is obtained by multiplying $G_1$ calculated by the gain calculator 27 by $E_p$, to the first subtractor 35a as described above, the first subtractor 35a outputs $(G_1 \times E_p - E_{f1})$ to the first controller 23a, the second multiplier 21b outputs a value, which is obtained by multiplying $G_2$ calculated by the gain calculator 27 by $E_p$ to the second subtractor 35b as described above, and the second subtractor 35b outputs $(G_2 \times E_p - E_{f2})$ to the second controller 23b.

Meanwhile, if the failure detector 37 detects a failure of the total drive amount detector 31, then a signal $S_b$ indicating the detection of the failure is input to the signal value switcher 39. Thereby, the signal value switcher 39 fixes $G_1$ to be input to the first multiplier 21a to ½ by the second switcher 39b, and fixes $G_2$ to be input to the second multiplier 21b to ½ by the fourth switcher 39d. At this time, $E_{f1}$ is input to the first subtractor 35a, while $E_{f2}$ is input to the second subtractor 35b.

Therefore, the first multiplier 21a outputs the value obtained by multiplying $E_p$ by ½ to the first subtractor 35a, the first subtractor 35a outputs $(E_p/2-E_{f1})$ to the first controller 23a, the second multiplier 21b outputs the value obtained by multiplying $E_p$ by ½ to the second subtractor 35b as described above, and the second subtractor 35b outputs $(E_p/2-E_{f2})$ to the second controller 23b.

Modification Example 3

In the configurations described above with reference to FIG. 2, FIG. 3, and FIG. 4, the position command section 33 is a constituent element of the control device 10. Alternatively, however, the position command section 33 is not a constituent element of the control device 10, and may be provided outside the control device 10. In other words, the command value generator 19 of the control device 10 does not need to include the position command section 33. In this case, the position command section 33 outputs the position command value $E_p$ to the first and second subtractors 35a and 35b of the command value generator 19 by wireless or by cable.

Modification Example 4

In modification example 2 described above with reference to FIG. 5, the position command section 33 (i.e. the command value generator 19) is a constituent element of the control device 10. Alternatively, however, the position command section 33 is not a constituent element of the control device 10, and may be provided outside the control device 10. In this case, the position command section 33 outputs the position command value $E_p$ to the first and second multipliers 21a and 21b by wireless or by cable.

REFERENCE SIGNS LIST 3 drive device, 5 first actuator (motor), 7 second actuator (motor), 9 driven body, 9a through hole, 10 control device, 11 power transmission mechanism, 13, 14, 15 gear, 17 screw shaft, 19 command value generator, 21a first multiplier, 21b second multiplier, 23a first controller, 23b second controller, 25a first state determiner, 25b second state determiner, 27 gain calculator, 29a first drive amount detector, 29b second drive amount detector, 31 total drive amount detector, 33 position command section, 35a first subtractor, 35b second subtractor, 37 failure detector, 39 signal value switcher, 39a first switcher, 39b second switcher, 39c third switcher, 39d fourth switcher, 41~50 first to tenth arithmetic sections, 53a, 53b, 54c, 54d limiters, 61 first motor, 63 second motor, 65a first multiplier, 65b second multiplier, 67a first subtractor, 67b second subtractor, 69a first controller, 69b second controller

The invention claimed is:

1. A control device for a drive device including a first and a second actuators, a driven body that is driven by the actuators, and a power transmission mechanism that transmits the driving forces of the actuators to the driven body such that the driven body is driven by an amount equivalent to the total of the drive amounts of the actuators, the control device comprising:

a first multiplier that outputs a value, which is obtained by multiplying a generated total drive command value by a first gain $G_1$, as a first drive command value;

a second multiplier that outputs a value, which is obtained by multiplying the total drive command value by a second gain $G_2$, as a second drive command value;

a first controller that controls the first actuator on the basis of the first drive command value;

a second controller that controls the second actuator on the basis of the second drive command value;

a gain calculator that calculates the gains $G_1$ and $G_2$;

a first drive amount detector that detects the drive amount of the first actuator and outputs a value $E_{f1}$ indicating the detection value to the gain calculator;

a second drive amount detector that detects the drive amount of the second actuator and outputs a value $E_{f2}$ indicating the detection value to the gain calculator; and a total drive amount detector that detects the drive amount of the driven body and outputs a value $E_f$ indicating the detection value to the gain calculator, wherein the gain calculator calculates the first gain $G_1$ according to a first gain calculation formula using $E_{f1}$ and $E_f$ as variables and calculates the second gain $G_2$ according to a second gain calculation formula using $E_{f2}$ and $E_f$ as variables, the first and second gain calculation formulae are set such that the first and the second gains $G_1$ and $G_2$ become ½ regardless of the values of the variables while the drive device is normal, $E_f$ changes within a range from zero to an upper limit value $L_{max}$, the gain calculator brings the first gain $G_1$ close to $(E_{f1} - L_{max}/2)/(E_f - L_{max})$ and brings the second gain $G_2$ close to $(E_{f2} - L_{max}/2)/(E_f - L_{max})$ in the case where $E_{f1}$, $E_{f2}$, or $E_f$ approaches zero.

2. The control device according to claim 1, wherein the first and second gain calculation formulae are:

$G_1 = G_{1A} + G_{1B}$ and $G_2 = G_{2A} + G_{2B}$, respectively, and $G_{1A}$, $G_{1B}$ and $G_{2A}$, $G_{2B}$ in the formulae are determined by $$G_{1A} = \frac{E_{f1}}{E_{f1max}} \times G_{1AA} \quad \text{[Expression 1]}$$

$$G_{2A} = \frac{E_{f2}}{E_{f2max}} \times G_{2AA}$$

-continued $$G_{1B} = \left(1 - \frac{E_{f1}}{E_{f1max}}\right) \times G_{1BB}$$

$$G_{2B} = \left(1 - \frac{E_{f2}}{E_{f2max}}\right) \times G_{2BB}$$

$$G_{1A} = \frac{E_{f1}}{E_{f1max}} \times G_{1AA}$$

$$G_{2A} = \frac{E_{f2}}{E_{f2max}} \times G_{2AA}$$

$$G_{1B} = \left(1 - \frac{E_{f1}}{E_{f1max}}\right) \times G_{1BB}$$

$$G_{2B} = \left(1 - \frac{E_{f2}}{E_{f2max}}\right) \times G_{2BB}$$

where $E_{f1max}$ denotes a maximum value that the drive amount of the first actuator can take in the case where the first and the second actuators are normally operating, and $E_{f2max}$ denotes a maximum value that the drive amount of the second actuator can take in the case where the first and the second actuators are normally operating, and $G_{1AA}$, $G_{1BB}$ and $G_{2AA}$, $G_{2BB}$ are determined by $$G_{1AA} = \frac{E_{f1}}{E_f} \qquad G_{2AA} = \frac{E_{f2}}{E_f} \quad \text{[Expression 2]}$$

$$G_{1BB} = \frac{E_{f1} - \frac{L_{max}}{2}}{E_f - L_{max}} \qquad G_{2BB} = \frac{E_{f2} - \frac{L_{max}}{2}}{E_f - L_{max}}$$

$$G_{1AA} = \frac{E_{f1}}{E_f} \qquad G_{2AA} = \frac{E_{f2}}{E_f}$$

$$G_{1BB} = \frac{E_{f1} - \frac{L_{max}}{2}}{E_f - L_{max}} \qquad G_{2BB} = \frac{E_{f2} - \frac{L_{max}}{2}}{E_f - L_{max}}$$

where $L_{max}$ is ideally equal to the sum of $E_{f1max}$ and $E_{f2max}$.

3. The control device according to claim 1, comprising:

a first state determiner that determines whether or not the first actuator is normally operating; and a second state determiner that determines whether or not the second actuator is normally operating, wherein the first multiplier outputs a value, which is obtained by multiplying the first gain $G_1$ calculated by the gain calculator by a total drive command value, as a first drive command value, and the second multiplier outputs a value, which is obtained by multiplying the second gain $G_2$ calculated by the gain calculator by the total drive command value, as a second drive command value in the case where the first and second state determiners have determined that the first and the second actuators, respectively, are normally operating, the second multiplier outputs a value, which is obtained by multiplying the second gain $G_2$ whose value is 1 by the total drive command value, as the second drive command value in the case where the first state determiner has determined that the first actuator is not operating, and the first multiplier outputs a value, which is obtained by multiplying the first gain $G_1$ whose value is 1 by the total drive command value, as the first drive command value in the case where the second state determiner has determined that the second actuator is not operating.

4. The control device according to claim 2, comprising:
a first state determiner that determines whether or not the first actuator is normally operating; and
a second state determiner that determines whether or not the second actuator is normally operating,
wherein the first multiplier outputs a value, which is obtained by multiplying the first gain $G_1$ calculated by the gain calculator by a total drive command value, as a first drive command value, and the second multiplier outputs a value, which is obtained by multiplying the second gain $G_2$ calculated by the gain calculator by the total drive command value, as a second drive command value in the case where the first and second state determiners have determined that the first and the second actuators, respectively, are normally operating,
the second multiplier outputs a value, which is obtained by multiplying the second gain $G_2$ whose value is 1 by the total drive command value, as the second drive command value in the case where the first state determiner has determined that the first actuator is not operating, and
the first multiplier outputs a value, which is obtained by multiplying the first gain $G_1$ whose value is 1 by the total drive command value, as the first drive command value in the case where the second state determiner has determined that the second actuator is not operating.

5. The control device according to claim 3,
wherein the first state determiner determines, on the basis of $E_{f1}$ and $E_f$, whether or not the first actuator is normally operating and
the second state determiner determines, on the basis of $E_{f2}$ and $E_f$, whether or not the second actuator is normally operating.

6. The control device according to claim 4,
wherein the first state determiner determines, on the basis of $E_{f1}$ and $E_f$, whether or not the first actuator is normally operating and
the second state determiner determines, on the basis of $E_{f2}$ and $E_f$, whether or not the second actuator is normally operating.

7. The control device according to claim 1,
wherein the total drive command value is a difference between $E_f$ and a position command value $E_p$ in a range from zero to a maximum value, and the difference is input as the total drive command value to the first and second multipliers, and the control device further comprises:
a failure detector that detects a failure of the total drive amount detector, and
a signal value switcher that sets a signal value to be input to the first and second multipliers as the total drive command value to the difference between $E_p$ and $2E_{f1}$ or the difference between $E_p$ and $2E_{f2}$ and fixes the first and second gains $G_1$ and $G_2$ to be input to the first and the second multipliers to ½ in the case where the failure detector has detected a failure of the total drive amount detector.

8. The control device according to claim 2,
wherein the total drive command value is a difference between $E_f$ and a position command value $E_p$ in a range from zero to a maximum value, and the difference is input as the total drive command value to the first and second multipliers, and the control device further comprises:
a failure detector that detects a failure of the total drive amount detector, and
a signal value switcher that sets a signal value to be input to the first and second multipliers as the total drive command value to the difference between $E_p$ and $2E_{f1}$ or the difference between $E_p$ and $2E_{f2}$ and fixes the first and second gains $G_1$ and $G_2$ to be input to the first and the second multipliers to ½ in the case where the failure detector has detected a failure of the total drive amount detector.

9. The control device according to claim 3,
wherein the total drive command value is a difference between $E_f$ and a position command value $E_p$ in a range from zero to a maximum value, and the difference is input as the total drive command value to the first and second multipliers, and the control device further comprises:
a failure detector that detects a failure of the total drive amount detector, and
a signal value switcher that sets a signal value to be input to the first and second multipliers as the total drive command value to the difference between $E_p$ and $2E_{f1}$ or the difference between $E_p$ and $2E_{f2}$ and fixes the first and second gains $G_1$ and $G_2$ to be input to the first and the second multipliers to ½ in the case where the failure detector has detected a failure of the total drive amount detector.

10. The control device according to claim 4,
wherein the total drive command value is a difference between $E_f$ and a position command value $E_p$ in a range from zero to a maximum value, and the difference is input as the total drive command value to the first and second multipliers, and the control device further comprises:
a failure detector that detects a failure of the total drive amount detector, and
a signal value switcher that sets a signal value to be input to the first and second multipliers as the total drive command value to the difference between $E_p$ and $2E_{f1}$ or the difference between $E_p$ and $2E_{f2}$ and fixes the first and second gains $G_1$ and $G_2$ to be input to the first and the second multipliers to ½ in the case where the failure detector has detected a failure of the total drive amount detector.

11. The control device according to claim 5,
wherein the total drive command value is a difference between $E_f$ and a position command value $E_p$ in a range from zero to a maximum value, and the difference is input as the total drive command value to the first and second multipliers, and the control device further comprises:
a failure detector that detects a failure of the total drive amount detector, and
a signal value switcher that sets a signal value to be input to the first and second multipliers as the total drive command value to the difference between $E_p$ and $2E_{f1}$ or the difference between $E_p$ and $2E_{f2}$ and fixes the first and second gains $G_1$ and $G_2$ to be input to the first and the second multipliers to ½ in the case where the failure detector has detected a failure of the total drive amount detector.

12. The control device according to claim 6,
wherein the total drive command value is a difference between $E_f$ and a position command value $E_p$ in a range from zero to a maximum value, and the difference is input as the total drive command value to the first and second multipliers, and the control device further comprises:

a failure detector that detects a failure of the total drive amount detector, and a signal value switcher that sets a signal value to be input to the first and second multipliers as the total drive command value to the difference between $E_p$ and $2E_{f1}$ or the difference between $E_p$ and $2E_{f2}$ and fixes the first and second gains $G_1$ and $G_2$ to be input to the first and the second multipliers to ½ in the case where the failure detector has detected a failure of the total drive amount detector.

13. The control device according to claim 1, wherein the total drive command value indicates a position command value $E_p$ in the range from zero to a maximum value, and the control device comprises:

a first subtractor that receives a first drive command value output by the first multiplier and $E_{f1}$ and outputs a difference between the two received signal values to the first controller;

a second subtractor that receives a second drive command value output by the second multiplier and $E_{f2}$ and outputs a difference between the two received signal values to the second controller;

the first controller controls the first actuator according to the difference between the first drive command value and $E_{f1}$, while the second controller controls the second actuator according to the difference between the second drive command value and En, and the control device further comprises:

a failure detector that detects a failure of the total drive amount detector, wherein the first and second gains $G_1$ and $G_2$ to be input to the first and second multipliers are fixed to ½ in the case where the failure detector has detected a failure of the total drive amount detector.

14. The control device according to claim 2, wherein the total drive command value indicates a position command value $E_p$ in the range from zero to a maximum value, and the control device comprises:

a first subtractor that receives a first drive command value output by the first multiplier and $E_{f1}$ and outputs a difference between the two received signal values to the first controller;

a second subtractor that receives a second drive command value output by the second multiplier and $E_{f2}$ and outputs a difference between the two received signal values to the second controller;

the first controller controls the first actuator according to the difference between the first drive command value and $E_{f1}$, while the second controller controls the second actuator according to the difference between the second drive command value and $E_{f2}$, and the control device further comprises:

a failure detector that detects a failure of the total drive amount detector, wherein the first and second gains $G_1$ and $G_2$ to be input to the first and second multipliers are fixed to ½ in the case where the failure detector has detected a failure of the total drive amount detector.

15. The control device according to claim 3, wherein the total drive command value indicates a position command value $E_p$ in the range from zero to a maximum value, and the control device comprises:

a first subtractor that receives a first drive command value output by the first multiplier and $E_{f1}$ and outputs a difference between the two received signal values to the first controller;

a second subtractor that receives a second drive command value output by the second multiplier and $E_{f2}$ and outputs a difference between the two received signal values to the second controller;

the first controller controls the first actuator according to the difference between the first drive command value and $E_{f1}$, while the second controller controls the second actuator according to the difference between the second drive command value and $E_{f2}$, and the control device further comprises:

a failure detector that detects a failure of the total drive amount detector, wherein the first and second gains $G_1$ and $G_2$ to be input to the first and second multipliers are fixed to ½ in the case where the failure detector has detected a failure of the total drive amount detector.

16. The control device according to claim 4, wherein the total drive command value indicates a position command value $E_p$ in the range from zero to a maximum value, and the control device comprises:

a first subtractor that receives a first drive command value output by the first multiplier and $E_{f1}$ and outputs a difference between the two received signal values to the first controller;

a second subtractor that receives a second drive command value output by the second multiplier and $E_{f2}$ and outputs a difference between the two received signal values to the second controller;

the first controller controls the first actuator according to the difference between the first drive command value and $E_{f1}$, while the second controller controls the second actuator according to the difference between the second drive command value and $E_{f2}$, and the control device further comprises:

a failure detector that detects a failure of the total drive amount detector, wherein the first and second gains $G_1$ and $G_2$ to be input to the first and second multipliers are fixed to ½ in the case where the failure detector has detected a failure of the total drive amount detector.

17. The control device according to claim 5, wherein the total drive command value indicates a position command value $E_p$ in the range from zero to a maximum value, and the control device comprises:

a first subtractor that receives a first drive command value output by the first multiplier and $E_{f1}$ and outputs a difference between the two received signal values to the first controller;

a second subtractor that receives a second drive command value output by the second multiplier and $E_{f2}$ and outputs a difference between the two received signal values to the second controller;

the first controller controls the first actuator according to the difference between the first drive command value and $E_{f1}$, while the second controller controls the second actuator according to the difference between the second drive command value and $E_{f2}$, and the control device further comprises:

a failure detector that detects a failure of the total drive amount detector, wherein the first and second gains $G_1$ and $G_2$ to be input to the first and second multipliers are fixed to ½ in the case where the failure detector has detected a failure of the total drive amount detector.

18. The control device according to claim 6,
wherein the total drive command value indicates a position command value $E_p$ in the range from zero to a maximum value, and the control device comprises:
a first subtractor that receives a first drive command value output by the first multiplier and $E_{f1}$ and outputs a difference between the two received signal values to the first controller;
a second subtractor that receives a second drive command value output by the second multiplier and $E_{f1}$ and outputs a difference between the two received signal values to the second controller;
the first controller controls the first actuator according to the difference between the first drive command value and $E_{f1}$, while the second controller controls the second actuator according to the difference between the second drive command value and $E_{f2}$, and the control device further comprises:
a failure detector that detects a failure of the total drive amount detector,
wherein the first and second gains $G_1$ and $G_2$ to be input to the first and second multipliers are fixed to ½ in the case where the failure detector has detected a failure of the total drive amount detector.

* * * * *